US 8,929,287 B1

(12) United States Patent
Huang et al.

(10) Patent No.: US 8,929,287 B1
(45) Date of Patent: *Jan. 6, 2015

(54) MULTIPLE VIRTUAL MACHINE CONSOLES IN A SINGLE INTERFACE

(75) Inventors: Xun Wilson Huang, Alameda, CA (US); Shane Lowry, San Francisco, CA (US); Rachit Siamwalla, Belmont, CA (US); James M. Phillips, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/531,365

(22) Filed: Jun. 22, 2012

Related U.S. Application Data

(63) Continuation of application No. 11/742,464, filed on Apr. 30, 2007, now Pat. No. 8,209,408.

(60) Provisional application No. 60/746,165, filed on May 1, 2006.

(51) Int. Cl.
 *H04W 4/00* (2009.01)
(52) U.S. Cl.
 USPC .......................................................... 370/328
(58) Field of Classification Search
 USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
 See application file for complete search history.

(56) References Cited

U.S. PATENT DOCUMENTS

| | | |
|---|---|---|
| 5,922,044 A | 7/1999 | Banthia |
| 7,506,265 B1 | 3/2009 | Traut et al. |
| 2002/0103882 A1* | 8/2002 | Johnston et al. ............... 709/218 |
| 2005/0033817 A1* | 2/2005 | Wei ............................... 709/208 |
| 2005/0138186 A1* | 6/2005 | Hesselink et al. ............. 709/229 |
| 2007/0186212 A1 | 8/2007 | Mazzaferri et al. |
| 2007/0204166 A1* | 8/2007 | Tome et al. .................... 713/182 |
| 2008/0229227 A1 | 9/2008 | Bantz et al. |

OTHER PUBLICATIONS

"http://wiki.openzaurus.org/HowTos/VNC", (Jun. 24, 2006),pp. 1-2.
"Parallels Workstation 2.2 User's Guide, Parallels Software International, Inc.", (2006), pp. 217.
"Parallels Review", Parallels Workstation for Windows free Download and Reviews, Fileforum http://fileforum.betanews.com/detail/Parallels-Workstation-for-Windows/1131276844/1, (Jan. 8, 2010), pp. 1-5.

* cited by examiner

*Primary Examiner* — Jung-Jen Liu (57) ABSTRACT

Multiple virtual machine consoles run in a single user interlace as an integrated unit. Multiple virtual machines are grouped into a logical configuration, and console of each virtual machine in the configuration is displayed a single user interface, such as a browser window. Users are provided with integrated access through the single user interface to the available input/output functions and local resources for each displayed virtual machine console.

19 Claims, 5 Drawing Sheets

MULTIPLE VIRTUAL MACHINE CONSOLES IN A SINGLE INTERFACE

PRIORITY CLAIM AND RELATED APPLICATION

This patent application is a continuation of and claims the benefit of co-pending U.S. patent application Ser. No. 11/742,464, entitled "Multiple Virtual Machine Consoles in a Single Interface," filed on Apr. 30, 2007, and assigned to the assignee of the present application, the entirety of which is hereby incorporated by reference, which itself claims the benefit of Provisional Application Ser. No. 60/746,165, titled "Multiple Virtual Machine Consoles in a Web Browser," filed on May 1, 2006, the entirety of which is hereby incorporated by reference.

TECHNICAL FIELD

This invention pertains generally to virtual computing, and more specifically to providing multiple virtual machine consoles in a single interface.

BACKGROUND

Virtualization technologies such as VMware and Microsoft Virtual Server are becoming prevalent in the market place. These technologies provide a virtual hardware abstraction to guest operating systems, and allow them to run as applications (virtual machines) in a functionally isolated environment on a host computer without being modified. Virtualization allows multiple virtual machines to run on a single physical server (host computer) simultaneously, providing functional and performance isolation for processor, memory, storage, etc. among the multiple instances of virtual machines.

Virtual Machines are virtual environments that simulate behavior of physical machines. Like physical machines, a virtual machine provides a console for accessing its mouse, keyboard and display. Typically the access to a console is provided via either a client application or via a web browser. VMware provides both a Windows and Linux application for accessing a virtual machine. Microsoft Virtual Server provides a browser based interface, in which the console is embedded in a browser as an ActiveX control. With this approach, end users do not need to install and maintain a client application on the underlying physical machine, and users can access the console from anywhere with a browser.

Over the past few decades, software has evolved from monolithic centralized applications to client-server based applications, and now to distributed applications. As software gets more complex, the components of a software program often reside on different servers, because of both the computational power required by complex applications, and the distributed nature of much contemporary software. For example, to setup a Microsoft Exchange Server system, an administrator typically has to setup 1) an Active Directory Server for domain administration, 2) a Backup Active Directory Server for redundancy, 3) one or more Exchange Backend Servers to manage mail storage and 4) one or more Exchange Front-end Servers to communicate with email clients.

These servers in the Exchange setup are closely related to each other, and should be administered and managed together as a group. Note also that these multiple Exchange Servers could be configured as multiple virtual machines installed on one or more physical machines. Under these circumstances, despite the fact that the virtual machines are related, there is no ready way to indicate that one virtual machine is related to another virtual machine, or the nature of the relationship.

Managing many virtual machines on the same desktop is challenging, as virtual machines can overlap with each other in a confusing manner. Many virtual machines are related to each other in the functionality that they perform, such as in the case of the Exchange servers described above. These relationships can lead to human error, where operations thought to be performed on one virtual machine can actually be performed on a different one.

What is needed are methods, computer readable media and computer systems for viewing and managing multiple virtual machines running on physical computers via a single interface.

SUMMARY OF INVENTION

Multiple virtual machine consoles run in a single user interface as an integrated unit. Multiple virtual machines are grouped into a logical configuration, and console of each virtual machine in the configuration is displayed a single user interface, such as a browser window. Users are provided with integrated access through the single user interface to the mouse, keyboard, screen and local resources for each displayed virtual machine console. The user can move the mouse cursor between consoles, and access each virtual machine with the mouse and keyboard. In short, the user can interact with each displayed virtual machine console as an integrated object of the single user interface. Cut-and paste of text and drag-and-drop of files and folders is provided between the multiple virtual machines.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
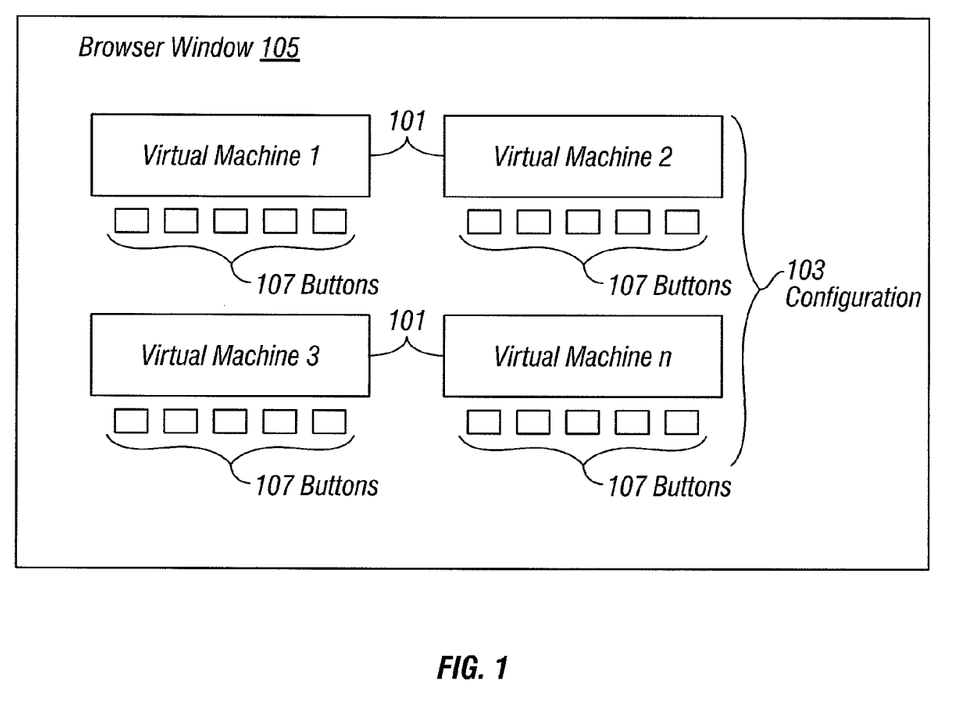
FIG. 1 is a block diagram illustrating multiple virtual machine consoles in a single browser window, according to some embodiments of the present invention.

Various embodiments of the present invention provide an approach for organizing related virtual machines 101 into logical configurations 103, and for viewing such a configuration in a single user interface 105. For example, a single browser window 105 can present a logical configuration 103 of multiple virtual machines 101 in a non-overlapping and easy to access manner. FIG. 1 depicts such an interface 105 according to one embodiment of the present invention, in which a configuration 103 consisting of multiple virtual machines 101 is presented in the same browser window 105. The configuration 103 of FIG. 1 consists of four virtual machines 101 as an example. The number of virtual machines 101 can be larger or smaller as desired.

Multiple virtual machines 101 can be grouped into a logical configuration 103. A configuration 103 simply refers to a set of logically related virtual machines 101. Because such a collection of virtual machines 101 is related, a user typically wants to view and operate the consoles of these virtual machines 101 from within a single interface 105. A configuration 103 functions as an encapsulation unit for these related virtual machines 101. A configuration 103 can be named and associated with user defined semantics. A configuration 103 can be operated on as a single unit where all virtual machines 101 in the configuration 103 can be powered on, backed up, shut down and/or snapshot at the same time. An end user working on a configuration 103 can switch between consoles of different virtual machines 101 within the single interface 105 (e.g., the desktop or browser page).

As illustrated in FIG. 1, users can operate the buttons 107 beneath the virtual machine 101 consoles to control the virtual machines 101 by performing operations such as power on, power off, suspend, reset, snapshot and revert. Of course, the illustrated buttons 107 are only examples of virtual machine 101 console user interface 105 components. Typically, users can interact with the virtual machines 101 through all available input/output functions, with the added advantage that the multiple virtual machines 101 are operating within a single user interface 105. For example, users can place the mouse cursor over a desired virtual machine 101, click into the virtual machine 101 and start controlling the user interface components thereof. The screens of the consoles are updated in real time. Keystrokes are transmitted to the guest operating system running inside the virtual machine 101. Also, the mouse can slide from one virtual machine 101 to another virtual machine 101 within a configuration 103. Different implementation techniques for achieving these features within the context of existing virtualization technology are discussed in detail below.

In order to embed virtual machine 101 consoles in a single browser interface 105, the three key console functions are addressed: mouse, keyboard and screen. It is also desirable to allow virtual machines 101 to access devices local to the browser 105. For instance, if a user wants to "insert" a CDROM "into" a virtual machine 101, the user should be able to physically insert the CDROM into the local host machine on which the virtual machine 101 is running, and signal the virtual machine 101 to use the CDROM. Other local devices in this category are, e.g., USB and Firewire devices, and serial port and parallel port devices. These console and local device access functionalities can be provided in a number of ways, for example by ActiveX controls, Java Applets, browser plug-ins and Flash.

Figure 2:
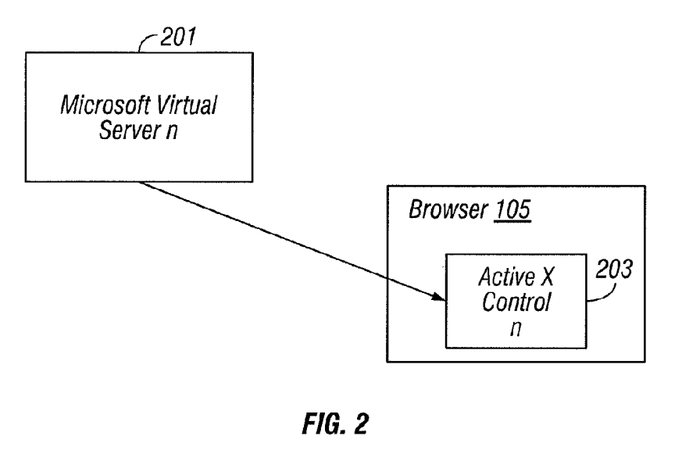
FIG. 2 is a block diagram illustrating the use of an ActiveX component to embed a virtual machine console in a browser, according to some embodiments of the present invention.

FIG. 2 illustrates a specific implementation example for Microsoft Virtual Server 201 (a specific example of a virtual machine 101 implementation). Microsoft Virtual Server 201 includes an ActiveX control 203 that can be embedded in a browser 105. To view and manage an entire configuration 103 consisting of multiple virtual machines 101 in a single interface 105, multiple instances of the ActiveX control 203 (one for each virtual machine 101 in the configuration 103) are embedded in the same browser 105.

Figure 3:
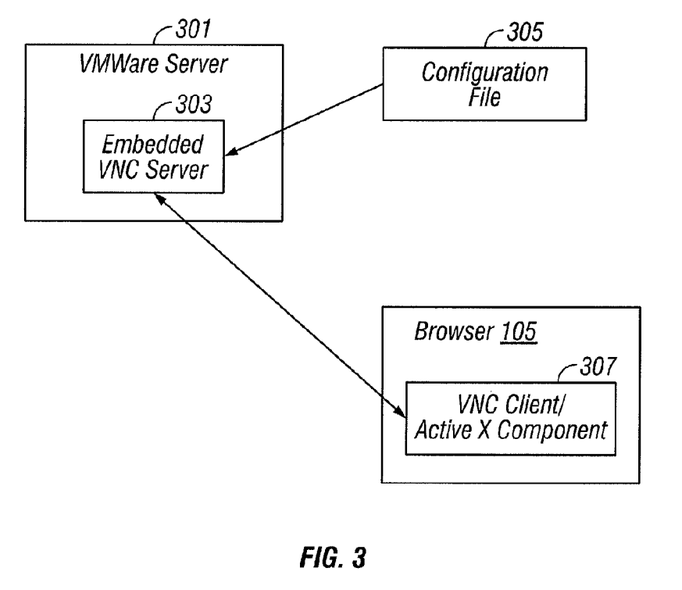
FIG. 3 is a block diagram illustrating the use of an embedded VNC server to embed a virtual machine console in a browser, according to some embodiments of the present invention.

FIG. 3 illustrates another implementation example, in which the virtual machines 101 are implemented with VMware Server (GSX) 301 technology. VMWare Server 301 includes an embedded Virtual Network Computing ("VNC") server 303. VNC is a graphical user interface ("GUI") desktop sharing system which uses the Remote Frame Buffer ("RFB") protocol to control another computer (which can be, for example, a virtual machine 101). VNC transmits the keyboard and mouse events from client computer to a VM, relaying the graphical screen updates back in the other direction. The VNC server 303 included in VWware server 301 can be activated via settings in the virtual machine 101 configuration file 305. The proper settings are illustrated in Table 1:

TABLE 1

RemoteDisplay.vnc.enabled = TRUE
RemoteDisplay.vnc.port = <port_number>
RemoteDisplay.vnc.password = <password>

According to some embodiments, the present invention provides a VNC client 307 in the form of an ActiveX control 203 (or alternative implementation such as an Applet, browser plug-in, etc). Similar to the implementation case of Microsoft Virtual Server 201, this ActiveX control 203 can also be embedded multiple times in the same browser 105 to allow the simultaneous viewing of multiple virtual machines 101 in the same configuration 103. The ActiveX control can scale down its resolution such that the virtual machine 101 console fits into a small browser window 105, or scale it up to a full screen mode.

Figure 4:
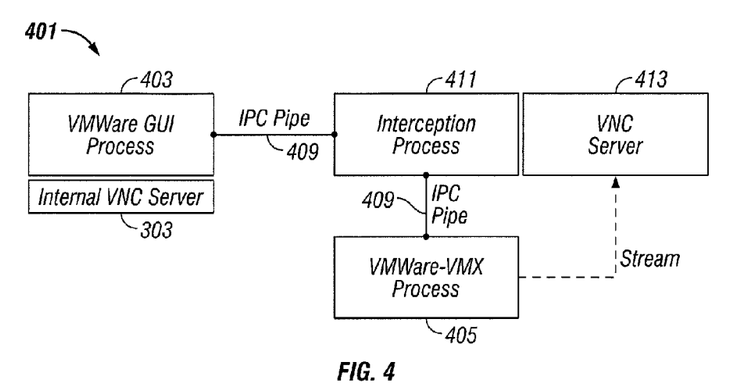
FIG. 4 is a block diagram illustrating the accessing of an internal VNC server to embed a virtual machine console in a browser, according to some embodiments of the present invention.

FIG. 4 illustrates another scenario, in which the virtual machines 101 are implemented in the form of VMware workstation 401. A VNC server 303 is not readily available in VMware workstation 401. In order to run multiple instances of VMware workstation 401 in a single interface 105, the client application 401 is manipulated to make it suitable for operation in a browser 105 environment.

First, the internal architecture of VMware workstation 401 is used to extract and display the desired information. While a VNC server 303 is not exposed publicly for VMware workstation 401, an implementation of a VNC server 303 does exist internally. The console of the VMware workstation client 401 leverages the internal VNC server 303 for display. VMware workstation's client 401 has two components, the VMware Graphical User Interface ("GUI") Shell 403, as well as the vmware-vmx process 405. The vmware-vmx portion 403 of the client 401 streams the display to the internal VNC server 303. In fact, the console can be streamed to any VNC server. The GUI shell 403 starts the vmware-vmx process 405 and communicates to the vmware-vmx 405 via an Interprocess Communication ("IPC") pipe 409. Messages in the pipe 409 communicate the Internet Protocol ("IP") address and port of the internal VNC server 303 to the vwmare-vmx process 405.

Given the internal mechanisms of VMware workstation 401, an interception layer 411 can be injected between the GUI client 403 and the MKS 405, so as to intercept and access all of the communication on the IPC channel 409. The interception layer 411 interprets and modifies the messages sent to the vmware-vmx 405 so as to specify a different VNC server 413 (IP address, port) that is provided according to the present invention. The MKS console 405 is routed to this VNC server 413.

To perform the interception, the original binary for the VMware vmware-vmx process 405 is renamed, e.g. to vmx-mks-old, and the original binary is replaced with a new binary, which comprises the interception layer 411. Thus, when VMware GUI process 403 starts the VMware vwmare-vmx process 405, the interception layer 411 is launched instead of the vmware-vmx process 405. The interception layer 411 communicates to the VMware GUI process 403, acting as if it is the real vmware-vmx process 405. Thus, the interception layer 411 receives and processes commands from the GUI process 403. The interception layer 411 start a VNC server instance 413, and starts vmx-mks-old, the real vmware-vmx process 405. The interception layer 411 relays the commands and messages to the vmx-mks-old process 405, modifying the messages to use the newly created VNC server 413 instead of the internal VNC server 303. It is to be understood that the underlying interception can be implemented in other ways as well, for example by intercepting relevant calls.

Once a VNC server 413 is running with the VMware workstation 401 console in it, the technique of FIG. 3 is employed using an ActiveX control 203 to connect to the console and display that in a browser 105. The same technique can be applied in other cases, for example with remote console clients.

Figure 5:
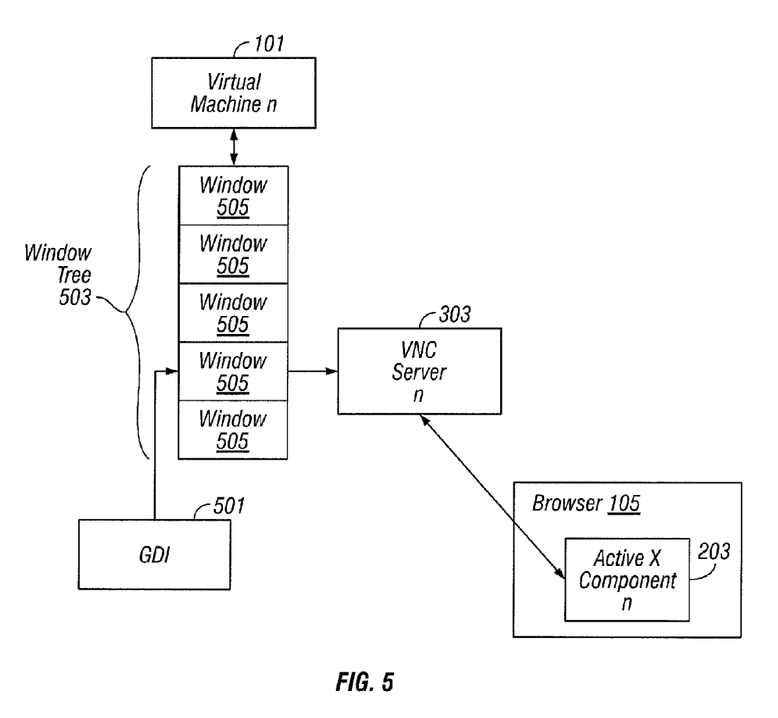
FIG. 5 is a block diagram illustrating the use of a GUI toolkit to embed a virtual machine console in a browser, according to some embodiments of the present invention.

Turning now to FIG. 5, more general techniques are discussed for accessing the display of an application window (e.g., a virtual machine 101 console), and embedding that in a browser 105. Most operating systems have a graphics library for windows manipulation. Microsoft Windows is used as an example in conjunction with FIG. 5, but it is to be understood that the same techniques can be applied in the context of other operating systems.

Microsoft provides an interface for windows manipulation called Graphics Device Interface (GDI) 501. Using Window's Application Programming Interface ("API"), it is possible to get a handle for the windows associated with an application (e.g., a virtual machine 101 as illustrated). An application has a tree 503 of sub-windows 505 (including menus, dialogs, buttons and other Windows components). By navigating through the windows tree 503 recursively, any specific window 505 of interest associated with the application can be found. The desired window 505 can be examined to access detailed information concerning the dimension and position of that particular sub-window 505. The GDI 501 can be used to extract pixels for that window 505, and subscribe to events for screen updates.

With this level of access, it is possible to route the desired display content of the application (e.g., the virtual machine 101 console) to, e.g., a VNC server 303, and from there to an embeddable component such as an ActiveX control 203. More specifically, cropping techniques can be employed to extract a particular sub-window 505, and the content thereof can be streamed to a target application, such as a VNC server 303. The transmission protocol can but need not be a VNC based protocol. Once the content reaches the VNC server 303, it can be routed to an embeddable component such as an ActiveX control 203, and thus inserted into an interface such as a browser 105.

Thus, the protocol for starting a virtual machine 101 according to this embodiment is to 1) create a hidden Windows desktop; 2) start the virtual machine 101 on the hidden desktop; 3) navigate the windows tree 503 until the right sub-window 505 is found; 4) use GDI 501 to crop the window 505 and subscribe to updates; 5) expose that display content as a VNC server 303 at a randomly chosen port; 6) connect a component such as an ActiveX control 203 to that VNC Server 303; and 7) embed the ActiveX control 203 in the browser 105.

This technique is more general than those described above in conjunction with FIGS. 2-4. This technique is not limited to a virtual machine 101 application per se, but can be generalized to transmit any part of an application's window to another physical or virtual computer.

Various methods of embedding multiple virtual machines 101 in a single interface 105 are described above in conjunction with FIGS. 2-5. Once multiple virtual machines 101 are embedded in a single interface 105, it is highly desirable to provide cut-and-paste of text and drag-and-drop of files and folders between these multiple virtual machines 101. There are two approaches for providing these functionalities: leveraging the browser 105 as a conduit; and, as illustrated in FIG. 6, utilizing communication between the virtualization host operating system 601 and the guest operating system 605.

The first approach runs automatically to the extent that it is supported and sufficient. Most VNC clients provide cut-and-paste support. When a cut or copy operation is performed on a VNC client, the clipboard is automatically synchronized with the local machine on which the browser 105 is installed. When a paste operation is performed, the contents in the local machine's clipboard will be transmitted to the remote client. This allows a user to perform a cut operation from one virtual machine 101, and paste the text into another virtual machine 101. This approach only works with a clipboard synchronizing client, and only works with cut-and-paste of plain text or other serializable objects. For example, cut-and-paste of complex .COM objects does not work well with this method.

Figure 6:
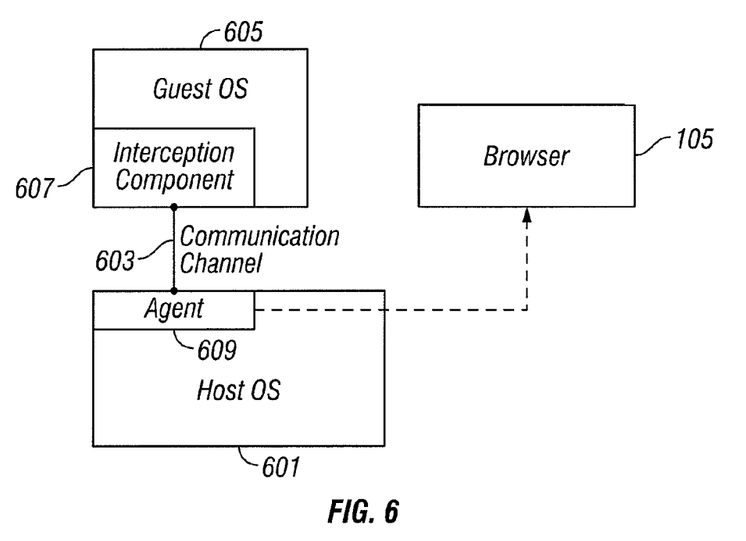
FIG. 6 is a block diagram illustrating the use of a communication channel between a guest operating system and a host operating system to manage virtual machines embedded in a single user interface, according to some embodiments of the present invention.

The second approach, as illustrated in FIG. 6, uses the host operating system 601 as the communication medium. First, for each virtual machine 101, a communication channel 603 is enabled between the guest operating system 605 and the host operating system 601. VMware has a utility called VMware Tools that enables this type of communication. For other virtualization technology that does not have this facility, or for a VMware virtual machine 101 without VMware Tools, the host operating system 601 and the guest operating system 605 are configured to communicate another way, e.g. via the serial port of the virtual machine 101 that is mapped to a named pipe 603 on the host. The host operating system 601 also needs to establish communication with the browser 105 of the end user. AJAX is an example of a mechanism that can provide communication between the browser 105 and the host operating system 601.

An interception component 607 is installed on the guest operating system 605 to perform interception of cut-and-paste events that occur on the guest operating system 605. When a cut operation is performed, the component 607 writes the content of the cut operation to, e.g., the serial port, connected to the host operating system 601 as a (named) pipe 603. An agent 609 runs on the host operating system 601, reads the incoming cut operation content from the pipe 603 and relays the information to the browser 105. When a paste operation is launched, the interception component 607 requests the clipboard content from, e.g., the serial port. The agent 609 on the host operating system 601 fetches the clipboard from the browser 105 and sends it to the guest operating system 605.

The drag-and-drop operation is very similar in terms of its communication mechanism. Unlike cut-and-paste where only a block of text or binary data is transferred via the host operating system 601, drag-and-drop operations copy files and/or folders to the guest operating system 605, and store them there. These files and folders can be subsequently transferred directly into a destination virtual machine 101 provided that it is on the same host. If the destination virtual machine 101 is on a different host, the objects have to be transferred to that remote physical machine. Since files and folders are substantially larger than cut-and-paste text, transferring the files directly to physical servers is more efficient than routing the contents through the browser 105.

Another desirable feature is the ability to move the mouse between virtual machine 101 console windows. When the guest operating system 605 is installed on a virtual machine 101, the mouse cursor is typically trapped inside the virtual machine 101. This means that once a mouse cursor is inside a virtual machine 101, it remains in the virtual machine 101 unless an escape key is pressed. Thus, switching between virtual machines 101 in the same browser window 105 requires the escape key to be pressed first. This is a highly undesirable behavior because end users cannot slide the mouse cursor directly from one virtual machine 101 to another.

Both VMware and Microsoft Virtual Server provide VMware Tools or the equivalent, which enables the mouse cursor to move in and out of virtual machines 101 without being trapped. After the VMware Tools are installed inside the guest operating system 605, the user's experience becomes much smoother. The VNC-style ActiveX control 203 does not trap mouse movement, so it does not create any additional complications in this regard.

VMware's implementation of VNC server 303 in GSX 3.2.x deviates from the standard RFP specification where relative mouse positions are used instead of absolute mouse positioning. When a standard VNC client is connected to this implementation of the VNC server 303, the mouse cursor will always move to the upper right hand corner and become stuck there. The problem is alleviated by installing VMware Tools or by extending the VNC client to support VMware's modification.

Figure 7:
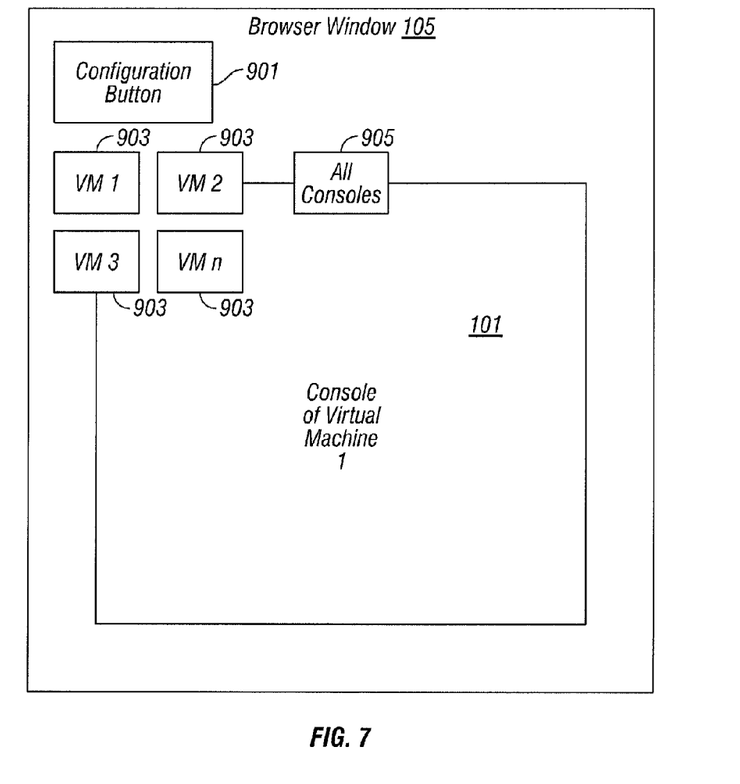
FIG. 7 is a block diagram illustrating another method for displaying multiple virtual machine consoles in a single user interface, according to some embodiments of the present invention.

FIG. 7 illustrates an alternative way to switch between virtual machines 101 in the same configuration 103. As illustrated, when virtual machine 101 consoles are large, all of the full consoles might not elegantly fit on the end user's screen. When a user positions the mouse cursor over the "Configuration" button 901 in the user interlace 105, a set of thumbnails 903 pops-up representing the consoles of all virtual machines 101 in the configuration 103. These thumbnails 903 are live screenshot images taken at the virtual machines 101, giving the user a very visual view of the state of each virtual machine 101. The user can click on a selected thumbnail 903 to view the corresponding virtual machine 101, and can click the "All Consoles" button 905 to view all the consoles in the same browser window 105.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on a non-transitory computer readable media as computer program products. Any form of computer readable medium can be used in this context, such as magnetic or optical storage media. Accordingly, the disclosure of the present invention is intended to be illustrative, but not limiting, of the scope of the invention, which is set forth in the following claims.

What is claimed is:

1. A computer implemented method for providing multiple virtual machines in a single user interface, the method comprising:

grouping a plurality of virtual machines into a configuration wherein at least some of the virtual machines separately execute operating systems;

displaying a console of each virtual machine of the configuration in the single user interface;

embedding for each virtual machine in the configuration, a corresponding client component in the single user interface;

intercepting for each virtual machine in the configuration, the display of the console for the virtual machine;

installing for each virtual machine in the configuration, a corresponding server component;

routing for each virtual machine in the configuration, an intercepted display to the corresponding server component;

directing each installed server component to communicate with its corresponding client component; and providing integrated access to console and local resources through the single user interface for each displayed virtual machine console wherein access to console functionality includes access to available input/output functions and access to local resources includes access to local devices at a host machine on which each of the virtual machines is executing;

wherein the single user interface comprises a single browser window, and wherein a screen associated with the displayed console of each virtual machine in the single user interface is updated in real time.

2. The computer implemented method of claim 1, wherein the consoles define applications and components of respective virtual machines, each of the displayed consoles providing management operation of an associated virtual machine for the configuration through the single user interface.

3. The computer implemented method of claim 1 further comprising:
enabling a user to interact with each displayed virtual machine console as an integrated object of the single user interface.

4. The computer implemented method of claim 1 further comprising:
directing a component of each virtual machine to communicate with the corresponding client or server component in the single user interface.

5. The computer implemented method of claim 1 further comprising:
providing data transfer functionality across the plurality of virtual machines such that data is transferred between at least a portion of the plurality of virtual machines.

6. The computer implemented method of claim 5 wherein the data transfer functionality comprises one from a group consisting of:
a cut-and-paste of the data;
a copy-and-paste of the data; and
a drag-and-drop of the data.

7. A computer implemented method for providing data transfer functionality across multiple virtual machines in a single user interface, the method comprising:
providing access to the multiple virtual machines in the single user interface, wherein the single user interface comprises a single browser window;
displaying a console of each virtual machine of the multiple virtual machines in the single user interface at the same time; and
providing the data transfer functionality across the multiple virtual machines such that data is transferred between at least a portion of the multiple virtual machines,
wherein the providing the data transfer functionality across the multiple virtual machines comprises:
enabling communication between guest operating systems of the multiple virtual machines to a host operating system of a host computer;
enabling communication between the single user interface and the host operating system;
intercepting at a first guest operating system a data transfer event for the data occurring at the first guest operating system;
communicating the data associated with the data transfer event to the host operating system; and
relaying the data to the single user interface.

8. The computer implemented method of claim 7 wherein the data transfer functionality comprises a cut-and-paste of the data.

9. The computer implemented method of claim 7 wherein the data transfer functionality comprises a copy-and-paste of the data.

10. The computer implemented method of claim 7 wherein the data transfer functionality comprises a drag-and-drop of the data.

11. The computer implemented method of claim 7, wherein the providing the data transfer functionality across the multiple virtual machines comprises:
responsive to a cut operation being performed on data at a first virtual machine, copying the data to a clipboard of a host operating system; and
responsive to a paste operation being performed at a second virtual machine, pasting the data from the clipboard of the host operating system to the second virtual machine.

12. The computer implemented method of claim 7, wherein the providing the data transfer functionality across the multiple virtual machines comprises:
responsive to a copy operation being performed on data at a first virtual machine, copying the data to a clipboard of a host operating system; and
responsive to a paste operation being performed at a second virtual machine, pasting the data from the clipboard of the host operating system to the second virtual machine.

13. The computer implemented method of claim 7, wherein the providing the data transfer functionality across the multiple virtual machines further comprises:
intercepting at a second guest operating system a paste operation;
fetching the data from the single user interface; and
receiving the data at the second guest operating system.

14. The computer implemented method of claim 7 wherein the data transfer event is a cut operation.

15. The computer implemented method of claim 7 wherein the data transfer event is a copy operation.

16. The computer implemented method of claim 7, wherein the providing the data transfer functionality across the multiple virtual machines comprises:
enabling communication between guest operating systems of the multiple virtual machines to a host operating system of a host computer;
enabling communication between the single user interface and the host operating system;
intercepting at a first guest operating system a drag-and-drop operation for the data occurring at the first guest operating system; and
transferring the data to a virtual machine of a second guest operating system.

17. At least one non-transitory computer readable medium containing a computer program product which when executed by a computer enables providing multiple virtual machines in a single user interface, the computer program product comprising:
program code for grouping a plurality of virtual machines into a configuration wherein at least some of the virtual machines separately execute operating systems;
program code for displaying a console of each virtual machine of the configuration in the single user interface;
program code for, for each virtual machine in the configuration, embedding a corresponding client component in the single user interface;
program code for, for each virtual machine in the configuration, intercepting the display of the console for the virtual machine;
program code for, for each virtual machine in the configuration, installing a corresponding server component;
program code for, for each virtual machine in the configuration, routing an intercepted display to the corresponding server component; and
program code for directing each installed server component to communicate with its corresponding client component; and
program code for providing integrated access to console and local resources through the single user interface for each displayed virtual machine console wherein access to console functionality includes access to available input/output functions and access to local resources includes access to local devices at a host machine on which each of the virtual machines is executing;
wherein the single user interface comprises a single browser window, and wherein a screen associated with the displayed console of each virtual machine in the single user interface is updated in real time.

18. The at least one non-transitory computer readable medium of claim 17, wherein the computer program product further comprises:
program code for providing data transfer functionality across the plurality of virtual machines such that data is transferred between at least a portion of the plurality of virtual machines.

19. The at least one non-transitory computer readable medium of claim 18 wherein the data transfer functionality comprises one from a group consisting of:
a cut-and-paste of the data;
a copy-and-paste of the data; and
a drag-and-drop of the data.

\* \* \* \* \*